Nov. 21, 1961  W. T. KAARLELA  3,009,785
COMPOSITION MONITOR FOR GASEOUS MATERIALS
Filed March 5, 1959  2 Sheets-Sheet 1
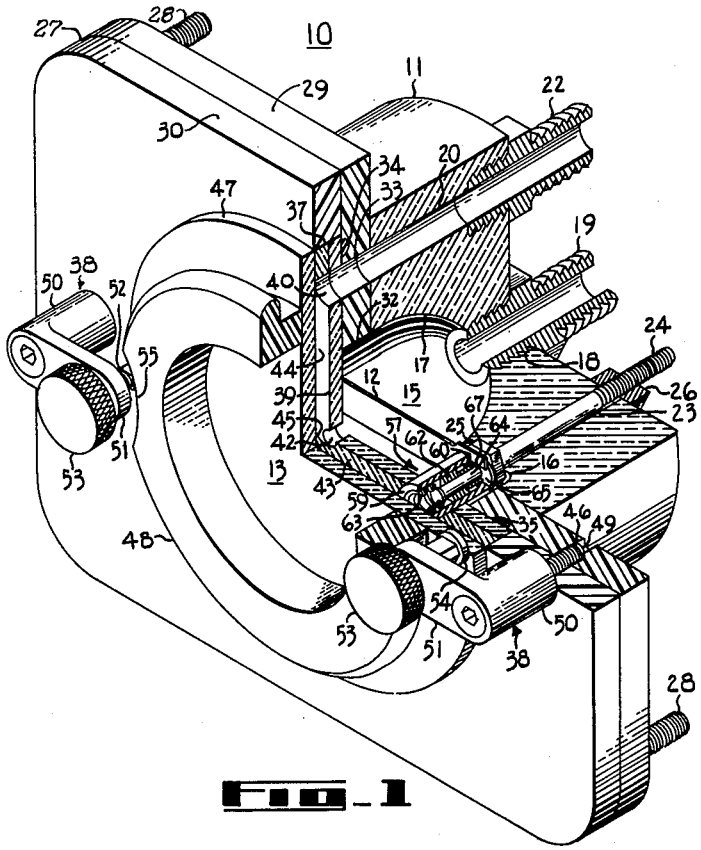
FIG_1
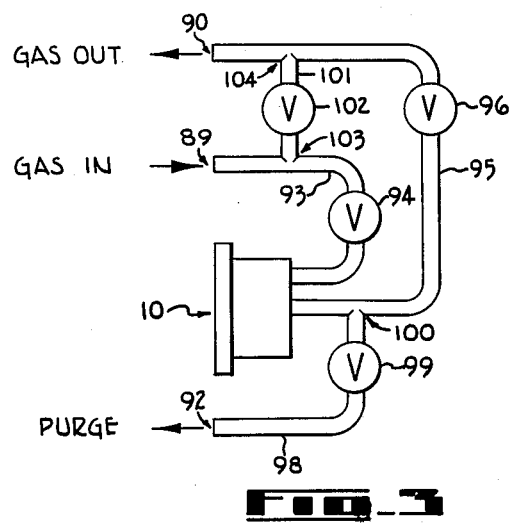
FIG_3
INVENTOR.
WILLIAM T. KAARLELA
BY
ATTORNEY

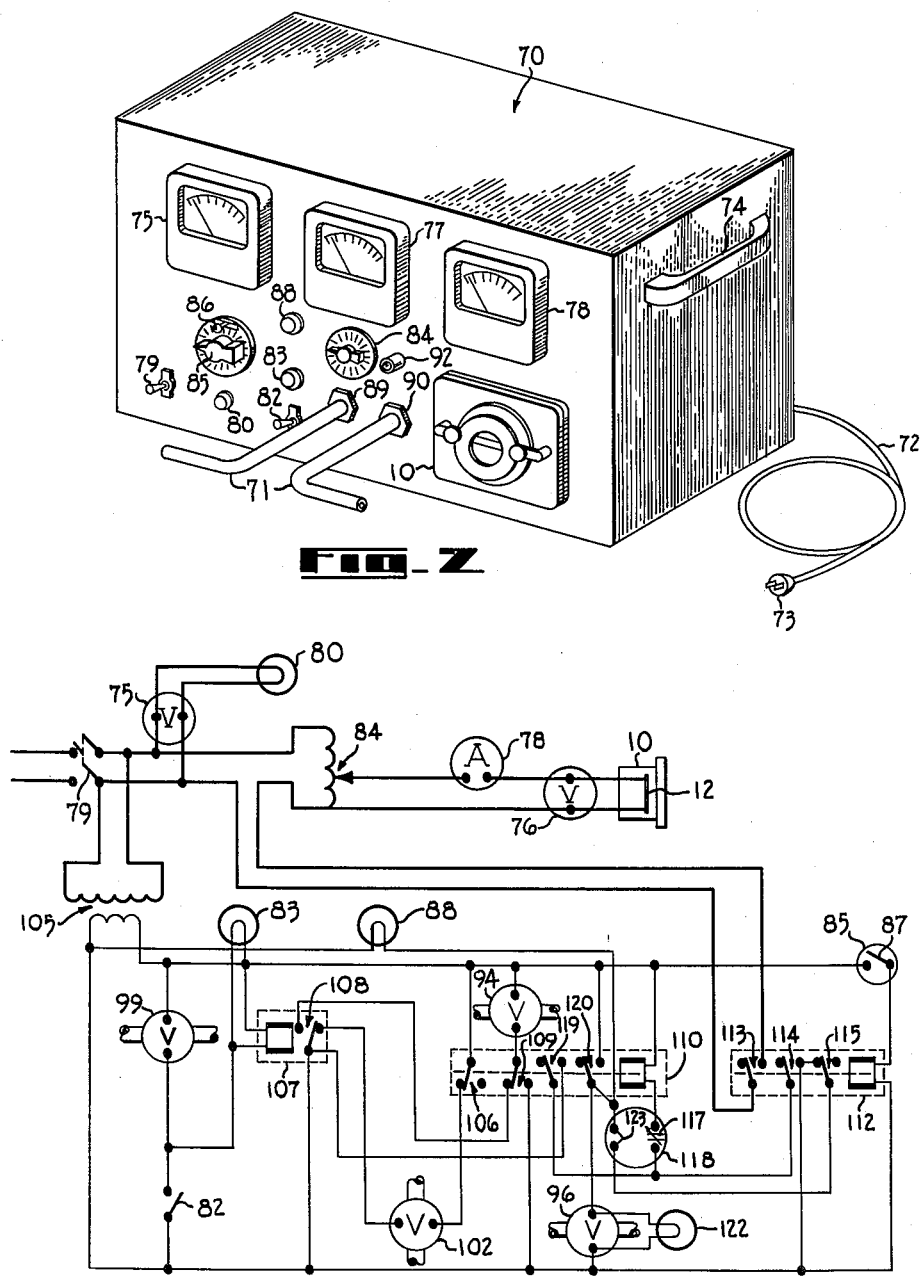

United States Patent Office 3,009,785
Patented Nov. 21, 1961

3,009,785
COMPOSITION MONITOR FOR GASEOUS MATERIALS
William T. Kaarlela, Fort Worth, Tex., assignor to General Dynamics Corporation, San Diego, Calif., a corporation of Delaware
Filed Mar. 5, 1959, Ser. No. 797,352
4 Claims. (Cl. 23—254)

The present invention relates generally to gas analysis, and more particularly, to the detection of undesirable impurities or contaminants in gases.

In many present day industrial processes it is imperative that certain operations, such as brazing, heliarc welding, carburizing, nitriding, cyaniding, etc., be carried out in atmospheres which are virtually void of contaminants, especially atmosphere contaminants such as oxygen, water vapor, and hydrogen. For example, in the brazing of a stainless steel or titanium, honeycomb core, "sandwich" panel structure the workpiece is usually enshrouded within an atmosphere of argon or helium gas. The presence of oxygen or water vapor in any substantial proportion results in an unsatisfactory braze and a consequent rejection of the structure. It is, therefore, extremely important to determine the relative purity of the gas prior to and during such operations.

Heretofore the detection of impurities in a gas has been effected by analyzing a sample of such gas by means of a mass spectrometer; the resulting mass spectrum being compared to a spectrum of the same gas of known purity.

Several disadvantages are inherent in such a method. Since the mass spectrometer is a highly delicate and precise instrument, it must generally be located remote from production line operations. It is, therefore, necessary to obtain a sample of the gas in a container at the production line and transport it to the instrument. In obtaining the sample there is introduced the possibility of inadvertent contamination of such sample. Another objection to the above method is the expense involved. In addition to the high operating cost, the instrument itself represents a large initial investment. Further, the spectrum obtained must be interpreted by personnel specially trained in spectrum analysis. The most serious disadvantage, however, is the time required to make such a spectrum analysis. This time is often on the order of several hours, which in many cases is longer than the time required for the brazing operation.

The instant invention primarily utilizes a property of certain metals whereby such metals become discolored when they combine chemically with oxygen to form oxides. A discardable metal indicator specimen is positioned within a hermetically sealable receptacle, and the receptacle is sealed and purged of entrapped atmospheric contaminants by circulating therethrough the gas to be checked. The indicator specimen is then heated to a predetermined temperature by passing low voltage, high amperage current therethrough for a predetermnied time (such temperature and time being empirically determined). The heating of the indicator specimen accelerates the reaction between such specimen and any contaminants present in the gas. Thus if contaminants are present in excess of that which is tolerable, such will be indicated by the discoloration or degree of discoloration of the indicator specimen.

Several advantages are available with the present invention. Of primary importance is the fact that the present invention makes it possible to check the purity of a gas in a matter of a few minutes, thus providing for a virtually constant monitoring of the gas during an operation. The apparatus of the invention is small enough and sturdy enough that it may be positioned in the gas line between the gas source and the workpiece, thus eliminating the obtaining of a sample in a container and the transportation thereof to the instrument. The cost involved herein is small compared to that of other methods, and the results obtained by this method may be interpreted by non-specialist personnel.

It is, therefore, an object of the present invention to provide an apparatus for the detection of undesirable contaminants in a gas which is rapid and reliable in operation.

Another object of the invention resides in the provision of an apparatus for the detection of impurities in a gas the size and construction of which is such that it may be positioned in the gas supply line between the gas source and the workpiece.

Yet another object is to provide an apparatus of the above class and character which is simple and inexpensive to operate.

Still another object resides in the provision of a method for the detection of unwanted impurities in a gas, the results of which method may be interpreted by non-specialist personnel.

These and other objects and advantages will be more apparent to those skilled in the art from the following description of the appended drawings wherein:

FIGURE 1 is an isometric half-sectional view of the receptacle component of the invention;

FIGURE 2 shows the preferred embodiment of the invention;

FIGURE 3 illustrates the gas flow pattern within the unit shown in FIGURE 2; and FIGURE 4 is a schematic of the wiring diagram of the preferred embodiment of the invention.

Referring now to the drawings, and in particular to FIGURE 1, the receptacle, generally indicated by the numeral 10, basically comprises a container 11 wherein is disposed a metal indicator specimen 12 and a seal plate 13.

The container 11 is preferably transparent and of cylindrical configuration, having an axial cavity or chamber 15 formed therein. At its forward end the chamber 15 extends outwardly in two places to form a pair of diametrically opposite radial cavities 16, whose purpose will be explained below. At its aft end the chamber converges along surface 17 and communicates with an axial aperture 18 which, as will be shown, serves as an outlet for the gas as it circulates through the receptacle. The aperture 18 is threaded to permit the insertion therein of an apertured connector fitting 19 to which may be attached a gas conduit. Directly above the outlet aperture 18, and at a distance so that it does not intersect the chamber 15, is a longitudinal inlet aperture 20 through the wall of container 11 in the aft end of which aperture is inserted another apertured connector fitting 22 similar to that described above. Extending rearwardly from each of the radial cavities 16 is a through aperture 23 wherein is disposed a bolt 24 of brass or other electrically conductive material. The bolt heads 25 are positioned within the radial cavities 16 and nuts 26 are affixed to the other ends of bolts 24 to secure them in position.

Onto the forward face of container 11 there is fixedly attaching a mounting plate 27, which is preferably of a generally rectangular configuration. Rearwardly directed, threaded studs 28 are provided at the corners of mounting plate 27 in order to provide means for attaching the receptacle to other structure. For simplicity of fabrication mounting plate 27 is preferably composed of two laminations 29 and 30 suitably bonded together in superposed relationship. The rear lamination 29 has a central opening 32 therethrough, which is of the same size and configuration as the forward opening of chamber 15 and radial cavities 16 of container 11. Another opening 33 is formed therein which communicates with inlet aperture 20 of container 11. An annular seal ring 34 of rubber or other suitable resilient material is retainedly positioned in a groove 35 on the forward face of laminate 29. The forward lamination 30 of mounting plate 27 is provided with an opening 37 therethrough wherein the seal plate 13 may be disposed so that it contacts the seal ring 34, and, when forceably secured in place by securing devices 38, effects an air tight seal of the chamber 15 of container 11.

The seal plate 13 consists preferably in three superposed, bonded, circular layers of a transparent material, such as Plexiglas. The rear layer 39 has an aperture 40 therein which aligns with aperture 33 of mounting plate 27 and inlet aperture 20 of container 11. A central aperture 42 is also provided for a purpose to be hereinafter explained. The intermediate layer 43 is formed with a radial slot 44 which at its outermost extremity communicates with aperture 40 and centrally communicates with central aperture 42 of rear layer 39. A fairing surface 45 at the central perimeter of slot 44 serves to provide optimum flow of the gas from the slot through the central aperture 42. The forward layer 47 is bonded to the front face of intermediate layer 43 and serves to seal slot 44 of intermediate layer 43 from the surrounding atmosphere. A ring 48 of opaque material may be bonded to the seal plate 13 in order to define the viewing area of the chamber 15.

The securing devices 38 are positioned diametrically opposite one to the other, each comprising a threaded stud 49 inserted within an aperture 46 in mounting plate 27, a sleeve 50 surrounding such stud 49 and rotatable thereabout, an arm 51 extending transversely from such sleeve 50 and integral therewith, and a thumbscrew 52 having a knurled head 53 extending through such arm 51. Tightening of the thumbscrew 52 urges the seal plate 13 against the seal ring 34, thus effecting an air tight seal therebetween. A disc 54 which is rotatable in relation to thumbscrew 52 may be positioned on the end thereof to prevent the damaging of the seal plate 13. When the thumbscrews 52 are loosened, the arms 51 of securing devices 38 may be rotated and the seal plate removed. If necessary, notches 55 may be formed in opaque ring 48 to provide for the rotation of the securing device.

Extending rearwardly from the rear face of seal plate 13 are a pair of specimen retaining devices 57 which serve to position the indicator specimen 12 within the chamber 15 of container 11 when the receptacle is assembled. Each such retaining device 57 comprises an outer, hollow cylinder 59 rigidly affixed to seal plate 13 and having inwardly directed shoulders 60 at the aft end thereof for retaining an apertured, slidable piston 62 which is urged rearwardly by a spring 63. A shaft 64 having a disc 65 on the end thereof extends through piston 62 and is slidable in relation thereto. The indicator specimen 12 is preferably fabricated of a relatively thin metal strip having a horizontal notch 67 at one of its ends and a vertical notch (not shown) at the other end. The indicator specimen is positioned in the retaining devices 57 by placing the end having the horizontal notch 67 so that it engages one shaft 64 adjacent disc 65. The indicator specimen is then rotated until the vertical notch at the opposite end engages the other shaft 64. Positioning of the indicator specimen should be done with small pliers, since manual touching of the specimen results in the deposition of body contaminants thereupon which would give a false test result. When the seal plate is positioned as shown, the specimen retaining devices 57 extend into the radial cavities 16 of chamber 15, and the test specimen 12 is positioned within chamber 15 of container 11. The spring loaded retaining devices 57 force the ends of the indicator specimen 12 against discs 65, which contact bolt heads 25 thus providing means for conducting an electric current through the indicator specimen and thereby heating it.

From the above description, it is seen that the gas flow through the receptacle 10 is as follows: Initially the gas to be checked for impurities enters the inlet aperture 20 of container 11 through a gas inlet conduit joined to connector fitting 22. The gas flows forward through such aperture 20, through opening 33 in the rear lamination 29 of mounting plate 27, through aperture 40 in rear layer 39 of seal plate 13 into the slot 44 in the intermediate layer 43. In the slot 44 the gas flows toward the center of the seal plate 13 and through central aperture 42 of rear layer 39 into the chamber 15 and impinges upon the indicator specimen 12. The gas then exits the chamber 15 through connector fitting 19 in outlet aperture 18 into a gas outlet conduit.

In FIGURE 2 the receptacle 10 is shown mounted in the forward face of unit 70 for testing the purity of or monitoring a gas flowing in a line 71. A cord 72 and plug 73 are provided for connecting the unit to a suitable electrical outlet, such as a 115 volt, 60 cycle, alternating current source. Since the unit is small enough to be portable, handles 74 are also provided. Various instruments, whose functions and operations will be more fully explained below, may be positioned on the forward face of the unit. Such instruments include voltmeters 75 and 77 for indicating the incoming voltage from the electrical source and the voltage across the indicator specimen respectively, an ammeter 78 for indicating the current flow in the indicator specimen, a master switch 79 for admitting current to the unit, a light 80 which indicates such current flow, a purge switch 82 which causes the receptacle 10 to be purged of residual atmospheric contamination prior to testing, a purge light 83 which indicates operation of the purge system, a variable transformer control device 84 which controls the current flow through the indicator specimen, a timer device 85 which controls the time during which the current flows through the test specimen, a timer switch 87 the closure of which allows current to flow through the test specimen, and a warning light 88 which indicates to the operator of the unit that the seal plate of the receptacle should not be removed.

The gas line 71 enters the unit through an inlet port, as indicated at 89, and exits through an outlet port, indicated at 90. A purge outlet 92 also exits the forward face of the unit.

Referring now to FIGURE 3, the flow of the gas within the unit to and from the receptacle 10 is controlled by means of a plurality of electrically actuated valves which are normally closed. The electrical circuitry involved in the operation of such valves will be described in conjunction with FIGURE 4. The flow pattern comprises an inlet conduit 93 having inlet valve 94 therein, an outlet conduit 95 wherein is positioned outlet valve 96, a purge conduit 98, which communicates with outlet conduit 95 as indicated at 100 between receptacle 10 and outlet valve 96, and has a purge valve 99 therein, and a shunt conduit 101 wherein is positioned shunt valve 102, such shunt conduit joining inlet conduit 93 as indicated at 103 between inlet port 89 and inlet valve 94, and joining outlet conduit 95 as indicated at 104 between outlet valve 96 and outlet port 90. When a test is not in progress, all the valves except shunt valve 102 are closed so that the gas merely flows into the unit 70 (FIGURE 2) through inlet port 89 (FIGURES 2 and 3) and is diverted through shunt conduit 101 (FIGURE 3) and out through outlet port 90. When it is desired to check the gas for impurities, the shunt valve is closed and inlet valve 94 and purge valve 99 are opened, the outlet valve 96 remaining closed. The gas flow is thus through inlet conduit 93, through receptacle 10, and out through the purge conduit 98 to the atmosphere. When the receptacle has been adequately purged of residual contaminants, the purge valve 99 is closed and outlet valve 96 is opened, thereby allowing the gas to flow out of the unit through outlet conduit 95. As will be hereinafter described the test specimen is heated during this later time. When the test is complete the inlet valve 94 and outlet valve 96 are closed and shunt valve 102 is opened thus diverting the gas through shunt conduit 101 as described above.

Referring now to FIGURE 4, when the master switch 79 of the electrical circuit is closed, there is a current flow through voltmeter 75 and to operation light 80. In addition current flows to step down transformer 105 whereby the incoming voltage is reduced, and therefrom to switch 107 of relay 108 which energizes shunt valve 102 through switch 106 of relay 110. When it is desired to test the purity of the gas in the line, an indicator specimen 12 is positioned in the receptacle 10 as described above. Purge switch 82 is then closed thus providing a current flow which energizes purge valve 99, purge light 83 and relay 107. The energizing of relay 107 closes its switch 108, thereby de-energizing shunt valve 102 and energizing inlet valve 94 through switch 109 of relay 110. During the purging operation the time desired for the current flow through the indicator specimen is set on timer 85 and the voltage drop across the indicator specimen is set on variable transformer control device 84. When the receptacle has been purged for the required time, the purge switch 82 is opened and the timer switch 87 is closed. The closure of timer switch 87 causes relay 112 to be energized, thus closing switches 113, 114 and 115 thereof. The closure of switch 113 allows current to flow through variable transformer 84 to the indicator specimen 12, thereby heating it. The variable transformer serves to reduce the voltage, generally to approximately one to three volts. The voltage across the indicator specimen 12 is indicated by voltmeter 76, while the current is indicated by ammeter 78. The closure of switch 114 causes relay 110 to be energized through thermoswitch 117 of vacuum tube delay relay 118. When the relay 110 is energized, switch 106 is opened, and switch 119 and switch 120 are closed. The closure of switch 120 energizes outlet valve 96. A light 122, which is positioned immediately behind the receptacle 10 and serves to illuminate the test specimen 12, may be directly connected to outlet valve 96, thus allowing the operator to observe the indicator specimen during the test.

When the time which was set on timer 85 has elapsed, the timer switch 87 is automatically opened, thus de-energizing relay 112 and opening the switches 113, 114 and 115. The opening of switch 113 stops the current flow through the indicator specimen 12. The opening of switch 114 stops the flow of current to thermoswitch 117 of time delay relay 118 through such switch 114; however, there is still a current flow to such thermoswitch 117 from switch 108 of relay 107 through switch 119 of relay 110. The opening of switch 115 results in a current flow to heater filament 123 of time delay relay 118 through switch 120 of relay 110. When the heater filament 123 has heated the thermoswitch 117 sufficiently, such thermoswitch opens and the relay 110 is de-energized, which results in the opening of the switches 109, 119 and 120, and the closing of switch 106. The opening of the switches 109 and 120 de-energizes inlet valve 94 and outlet valve 96, respectively. The closing of switch 106 energizes shunt valve 102, thus restoring the original flow of gas, and the opening of switch 119 stops the current flow to the heater filament 123 of time delay relay 118. The purpose of the time delay relay is to cool the indicator specimen after the test has been completed by allowing the gas to flow thereupon for a short time after the current flow through such indicator specimen has ceased.

After the test is complete, the indicator specimen is removed from the receptacle and further inspected for discoloration. Such discoloration is determined by several variables, such as the amount of gas contacting the indicator specimen, the temperature of the indicator specimen during the test and the time duration of the test. If the flow rate of the gas is known, the amount of gas which contacts the indicator specimen in a given time may be controlled by setting the appropriate time on the timer device. If an indicator specimen of standard size and material is utilized, the temperature of such specimen may be controlled by means of the variable transformer. The amount of discoloration which is allowable for a given type of operation will, of course, have to be determined by empirical methods. Once this has been established, a color chart showing the various shades of discolorations corresponding to the various contamination levels may be employed for comparison purposes. Thus if after a test, the specimen is discolored beyond that which is allowable, the contaminated gas source must be replaced.

Since a certain amount of contamination is virtually always present in a gas, a given indicator specimen should be used only once. After a test has been run, the used specimen may be filed as a permanent record, if desired.

Various metals, such as titanium, molybdenum, stainless steel, etc. may be employed for use as indicator specimens. The choice of material is generally determined by its reaction with the most probable contaminants, which are usually oxygen and water vapor. It has been found that titanium is an excellent choice for most applications since it exhibits differentiable discoloration when reacted with varying amounts of oxygen.

In operations such as carburizing, hydriding and cyaniding, the present invention may be employed to good advantage by first subjecting a small sample of the parent metal to the action of the gas for the time and at the temperature required for the operation. When the test has been completed, the sample may be analyzed metallographically for the results of the test operation, and consequently the purity of the gas employed.

As thus described the present invention is characterized as a novel, rapid and reliable method, with associated apparatus, for the detection of impurities in a gas, comprising the steps of removably locating a metal indicator specimen within the chamber of a container which is hermetically sealable by means of a removable seal plate, purging such chamber of residual, entrapped atmospheric contaminants, heating such indicator specimen to a predetermined temperature for a predetermined time while such gas flows thereupon, the reaction between the impurities of such gas and the test specimen causing an observable change, such as discoloration, of such indicator specimen.

Although only the preferred embodiment of the invention has been disclosed herein, it is to be understood that the invention is not limited thereto, as many variations and modifications will be readily apparent to those skilled in the art; and the invention is to be given its broadest possible interpretation within the scope and terms of the following claims.

I claim:

1. Apparatus for the detection of contaminants in a gas comprising, in combination, a receptacle, said receptacle including a transparent, cylindrical container having a cavity therein, a seal plate and seal plate securing devices for hermetically sealing said container, said seal plate being composed of three superposed bonded layers of transparent material, retaining devices for retaining a removable, metal indicator specimen in said cavity, an inlet aperture communicating with said cavity formed by a through longitudinal opening in the wall of said container, a peripheral opening in the rearmost layer of said seal plate, a radial slot in the intermediate layer of said seal plate and a central opening in said rearmost layer, an outlet aperture communicating with said cavity through the rear face of said container, conduit means connected to said inlet and outlet apertures for circulating said gas through said receptacle, valve means disposed within said conduit means for controlling the circulation of said gas through said conduit means, electrical means for operating said valve means and for heating said indicator specimen to a predetermined temperature for a predetermined time, whereby any contaminants in said gas are reacted with said indicator specimen thereby causing an observable change in the characteristics of said indicator specimen.

2. Apparatus for the detection of contaminants in a gas comprising, in combination, a receptacle, said receptacle including a transparent, cylindrical container having a cavity therein, a seal plate and seal plate securing devices for hermetically sealing said container, said seal plate being composed of three superposed bonded layers of transparent material, retaining devices for retaining a removable, metal indicator specimen in said cavity, an inlet aperture communicating with said cavity and formed by a through, longitudinal opening in the wall of said container, a peripheral opening in the rearmost layer of said seal plate, a radial slot in the intermediate layer of said seal plate and a central opening in said rearmost layer, an outlet aperture communicating with said cavity through the rear face of said container, conduit means for circulating said gas through said receptacle, said conduit means including an inlet conduit connected to said inlet aperture, an outlet conduit connected to said outlet aperture, a purge conduit connected to said outlet conduit and a shunt conduit connecting said inlet conduit to said outlet conduit, valve means disposed within said conduit means for controlling the flow of said gas through said conduit means, said valve means including an inlet valve in said inlet conduit, an outlet valve in said outlet conduit, a purge valve in said purge conduit and a shunt valve in said shunt conduit, electrical means for operating said valve means and for heating said indicator specimen to a predetermined temperature for a predetermined time, whereby any contaminants in said gas are reacted with said indicator specimen thereby causing an observable change in the characteristics of said indicator specimen.

3. Apparatus for the detection of contaminants in a gas comprising, in combination, a receptacle having a cavity therein, a seal plate of transparent material for hermetically sealing said receptacle having a front face and a cavity-bounding rear face, retaining means for supporting a metal indicator specimen within said cavity adjacent the seal plate rear face, an inlet passage in communication with said cavity for directing said gas thereinto for contact with said indicator specimen, said inlet passage extending radially of said seal plate to terminate in an outlet aperture in the rear face of said plate, an outlet passage in communication with said cavity for conducting said gas out of said cavity, conduit means connected with said inlet and said outlet passages for effecting circulation of said gas through said receptacle cavity, valve means disposed within said conduit means for controlling the circulation of said gas through said conduit means, and electrical means for operating said valve means and for heating said indicator specimen to a predetermined temperature for a predetermined time, whereby any contaminants in said gas are reacted with said indicator specimen thereby causing an observable change in the characteristics of said indicator specimen.

4. Apparatus for the detection of contaminants in a gas comprising, in combination, a receptacle having a cavity therein, a seal plate of transparent material for hermetically sealing said receptacle having a front face and a cavity-bounding rear face, retaining means for supporting a metal indicator specimen within said cavity adjacent the seal plate rear face, an inlet passage in communication with said cavity for directing said gas thereinto for contact with said indicator specimen, said inlet passage extending radially of said seal plate to terminate in an outlet aperture in the rear face of said plate, an outlet passage in communication with said cavity for conducting said gas out of said cavity, conduit means connected with said inlet and said outlet passages for effecting circulation of said gas through said receptacle cavity, said conduit means including an inlet conduit in communication with said inlet passage, an outlet conduit in communication with said outlet passage, a purge conduit in communication with said outlet conduit and a shunt conduit connecting said inlet conduit with said outlet conduit, valve means disposed within said conduit means for controlling the flow of said gas through said conduit means, said valve means including an inlet valve in said inlet conduit, an outlet valve in said outlet conduit, a purge valve in said purge conduit and a shunt valve in said shunt conduit, electrical means for operating said valve means and for heating said indicator specimen to a predetermined temperature for a predetermined time, whereby any contaminants in said gas are reacted with said indicator specimen thereby causing an observable change in the characteristics of said indicator specimen.

References Cited in the file of this patent
UNITED STATES PATENTS

| | | |
|---|---|---|
| 1,756,794 | Mabbs | Apr. 29, 1930 |
| 1,889,890 | Erickson | Dec. 6, 1932 |
| 2,049,947 | Cope | Aug. 4, 1936 |